A. T. BLEYLEY.
Vegetable Cutter.
No. 50,679.
Patented Oct. 31, 1865.
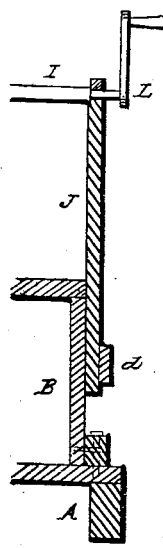
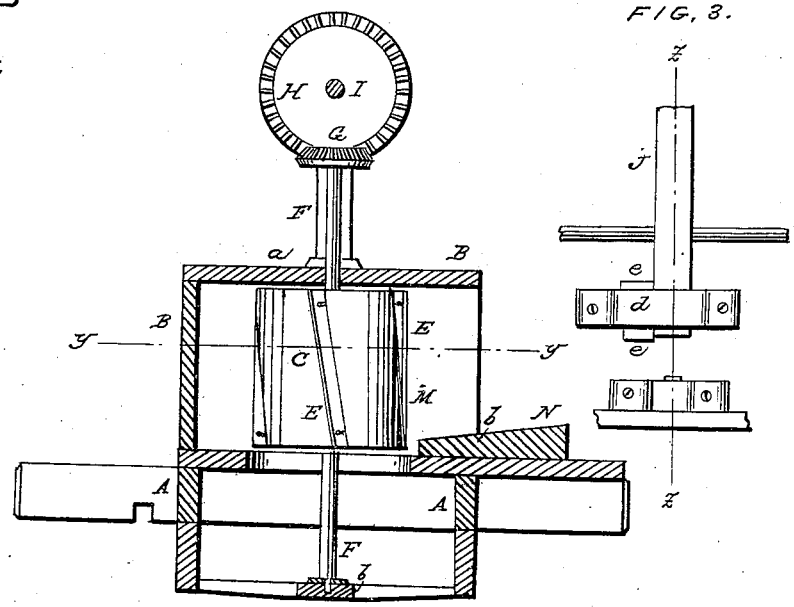
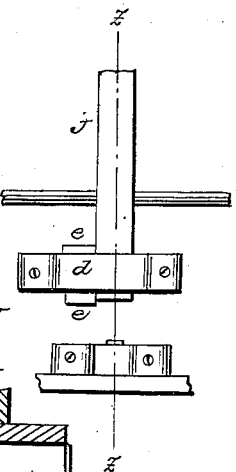
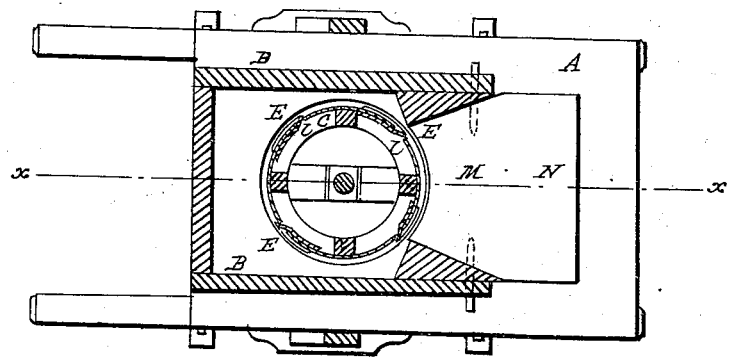
WITNESSES:
INVENTOR.

UNITED STATES PATENT OFFICE.

A. T. BLEYLEY, OF OTTUMWA, IOWA.

VEGETABLE-CUTTER.

Specification forming part of Letters Patent No. 50,679, dated October 31, 1865.

*To all whom it may concern:*

Be it known that I, A. T. BLEYLEY, of Ottumwa, in the county of Wapello and State of Iowa, have invented a new and Improved Vegetable-Cutter; and I do hereby declare that the following is a full, clear, and exact description thereof, which will enable others skilled in the art to make and use the same, reference being had to the accompanying drawings, forming part of this specification, in which—

Figure 1 is a longitudinal vertical section of the vegetable-cutter, taken in the plane of the line $x\,x$, Fig. 2, which is a horizontal section taken in the plane of the line $y\,y$, Fig. 1; Fig. 3, a partial side view, and Fig. 4 a section through it, taken in the plane of the line $z\,z$, Fig. 3.

Similar letters of reference indicate like parts.

A in the drawings represents the supporting-platform or frame-work of the machine, upon the upper side of which is placed the cylinder-box B, and secured thereto in any proper manner by screws or otherwise. In the cylinder-box B the hollow cylinder C is placed in a vertical position, and turns, by its shaft F, in bearings of the top piece, $a$, of the box, and the cross-tie $b$ of the platform A, which shaft receives motion through a bevel-gear, G, upon its upper end, interlocking with a bevel-gear, H, upon the transverse horizontal shaft I, having a crank-handle, L.

The side posts, J J, in which the shaft I turns, can be regulated in height at pleasure by means of wedges $c\,c$ inserted in and tightly holding them in the fixed staples or clasps $d\,d$ of the box.

Around and upon the exterior periphery of the cylinder and extending in the direction of its length, but at an angle to the same, or, in other words, spirally about it, are arranged or attached in any proper manner a series of knife or cutter blades, E E, by which the vegetables are cut or sliced as their common central cylinder revolves, they being fed thereto through the side opening, M, of the cylinder box, upon an inclined guide table or bed, N, attached to the platform A by a pin, $h$, so as to be easily detached when desired to get at the knife-cylinder for removing its cutters to sharpen them or to replace them with new ones. The vegetable, as it is cut or sliced by the knives, passes through the opening or jaw $l$ of the same into the interior of the knife-cylinder C, when it falls to the bottom of the machine.

Between each knife-blade I cover the cylinder with a sheet of tin or other suitable metal for protecting the same, and which can be easily and readily cleansed.

In the use of my vegetable-cutter it is the most advantageous to wedge it in any proper manner in the top of a tub or other vessel, so that as the vegetables are sliced by it they shall fall into the tub, from which, when it is full, they can be readily removed at any time when desired.

I claim as new and desire to secure by Letters Patent—

The vegetable-cutter arranged and operating substantially as shown in the drawings and herein described.

A. T. BLEYLEY.

Witnesses:
C. AUWERDA,
PATRICK BRADY.